US012330425B2

(12) United States Patent
Zhao et al.

(10) Patent No.: US 12,330,425 B2
(45) Date of Patent: Jun. 17, 2025

(54) INK CARTRIDGE

(71) Applicant: SPEED INFOTECH (BEIHAI) COMPANY LIMITED, Guangxi (CN)

(72) Inventors: Chenhai Zhao, Guangxi (CN); Jinghua He, Guangxi (CN); Min Liu, Guangxi (CN); Heng Zhang, Guangxi (CN)

(73) Assignee: SPEED INFOTECH (BEIHAI) COMPANY LIMITED, Guangxi (CN)

( * ) Notice: Subject to any disclaimer, the term of this patent is extended or adjusted under 35 U.S.C. 154(b) by 41 days.

(21) Appl. No.: 18/274,033

(22) PCT Filed: Jan. 24, 2022

(86) PCT No.: PCT/CN2022/073436
§ 371 (c)(1),
(2) Date: Jul. 25, 2023

(87) PCT Pub. No.: WO2022/161304
PCT Pub. Date: Aug. 4, 2022

(65) Prior Publication Data
US 2024/0424802 A1 Dec. 26, 2024

(30) Foreign Application Priority Data
Jan. 26, 2021 (CN) ........................ 202110105944.5

(51) Int. Cl.
*B41J 2/175* (2006.01)

(52) U.S. Cl.
CPC ....... *B41J 2/17553* (2013.01); *B41J 2/17513* (2013.01); *B41J 2/17523* (2013.01); *B41J 2/1754* (2013.01)

(58) Field of Classification Search
CPC .... B41J 2/175; B41J 2/17506; B41J 2/17509; B41J 2/17513; B41J 2/1752; B41J 2/17523; B41J 2/1754; B41J 2/17553
See application file for complete search history.

(56) References Cited

U.S. PATENT DOCUMENTS 5,359,357 A * 10/1994 Takagi ..................... B41J 25/34 347/49
7,682,005 B2 * 3/2010 Ramakrishnan ........... B41J 2/19 347/86

(Continued)

FOREIGN PATENT DOCUMENTS

CN 1796137 A 7/2006
CN 2910571 Y 6/2007

(Continued)

OTHER PUBLICATIONS

International Search Report mailed Apr. 24, 2022; International Patent Application No. PCT/CN2022/073436 filed Jan. 24, 2022. ISA/CN.

(Continued)

*Primary Examiner* — Anh T Vo
(74) *Attorney, Agent, or Firm* — McDonald Hopkins LLC

(57) ABSTRACT

An ink cartridge includes an ink container and a cartridge shell. The cartridge shell has a printhead and a mounting member which are disposed on the cartridge shell. The ink container is detachably connected to the mounting member. The ink container includes an ink container body and an ink outlet assembly. The ink container body includes an ink storage cavity configured to store ink. An ink inlet of the ink outlet assembly communicates with the ink storage cavity. An ink outlet of the ink outlet assembly communicates with an ink entry of the printhead. The ink container is connected to the cartridge shell with the arrangement of the mounting member and through the connection between the mounting member and the ink container.

20 Claims, 17 Drawing Sheets

(56) References Cited

U.S. PATENT DOCUMENTS

| | | | | |
|---|---|---|---|---|
| 8,684,505 | B2 * | 4/2014 | Campbell-Brown | ...... B41J 2/19 347/49 |
| 2011/0279584 | A1 | 11/2011 | Mallory et al. | |

FOREIGN PATENT DOCUMENTS

| | | | |
|---|---|---|---|
| CN | 203401815 | U | 1/2014 |
| CN | 108290414 | A | 7/2018 |
| CN | 212022025 | U | 11/2020 |
| CN | 112743991 | A | 5/2021 |
| CN | 112793308 | A | 5/2021 |
| CN | 214821926 | A | 11/2021 |
| EP | 1892103 | A2 | 2/2008 |
| EP | 3549773 | A1 | 10/2019 |
| JP | 2014073685 | A | 4/2014 |
| WO | 2013102382 | A1 | 7/2013 |

OTHER PUBLICATIONS

EESR dated Nov. 12, 2024, European Patent Application No. 22745179.6. 10 pages.

* cited by examiner

INK CARTRIDGE

CROSS-REFERENCE TO RELATED APPLICATION(S)

This is a national stage application filed under 37 U.S.C. 371 based on International Patent Application No. PCT/CN2022/073436, filed Jan. 24, 2022, which claims priority to Chinese Patent Application No. 202110105944.5, entitled "INK CARTRIDGE" and filed with the China National Intellectual Property Administration (CNIPA) on Jan. 26, 2021, the disclosure of which is incorporated herein by reference in its entirety.

TECHNICAL FIELD

The present application relates to the printing equipment field, for example, an ink cartridge.

BACKGROUND

With the gradual popularization of automatic office equipment, printing equipment plays an increasingly important role in people's normal work and study. Among the printing equipment, ink-jet printing equipment is favored by users due to the advantages of low energy consumption, no pollution, and convenient color printing.

An ink cartridge of the ink-jet printing equipment is generally composed of a cartridge shell and an ink container. The ink container is a replaceable consumable and is generally inserted into the cartridge shell. To implement the secure connection between the ink container and the cartridge shell, a connection structure is disposed on the cartridge shell and the ink container to make the cartridge shell match the ink container. When the corresponding connection structure is processed on the cartridge shell, the strength of the cartridge shell is lowered. Moreover, when the connection structure is processed on the cartridge shell with a printhead, it is difficult to clamp and position the cartridge shell, and the printhead may be damaged by collision.

SUMMARY

The present application provides an ink cartridge which does not need a connection structure to be processed on a cartridge shell to match an ink container, resulting in a high structural strength of the cartridge shell, preventing a printhead from being damaged, and prolonging the service life of the cartridge shell.

The present application provides an ink cartridge. The ink cartridge includes an ink container and a cartridge shell. The cartridge shell has a printhead and a mounting member which are disposed on the cartridge shell. The ink container is detachably connected to the mounting member. The ink container includes an ink container body and an ink outlet assembly. The ink container body includes an ink storage cavity configured to store ink. An ink inlet of the ink outlet assembly communicates with the ink storage cavity. An ink outlet of the ink outlet assembly communicates with an ink entry of the printhead.

REFERENCE LIST

Figure 1:
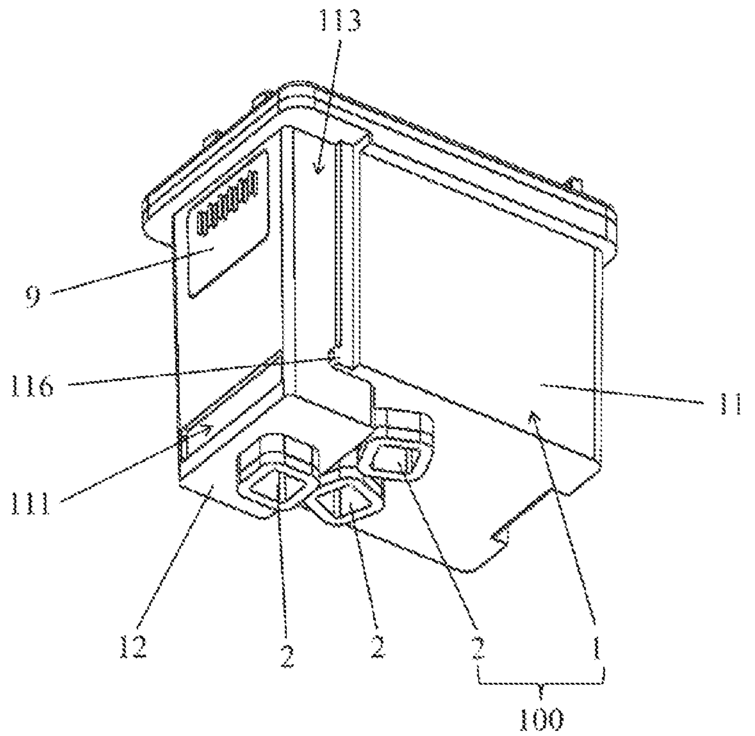
FIG. 1 is a first axonometric view of an ink container according to an embodiment of the present application.
Figure 2:
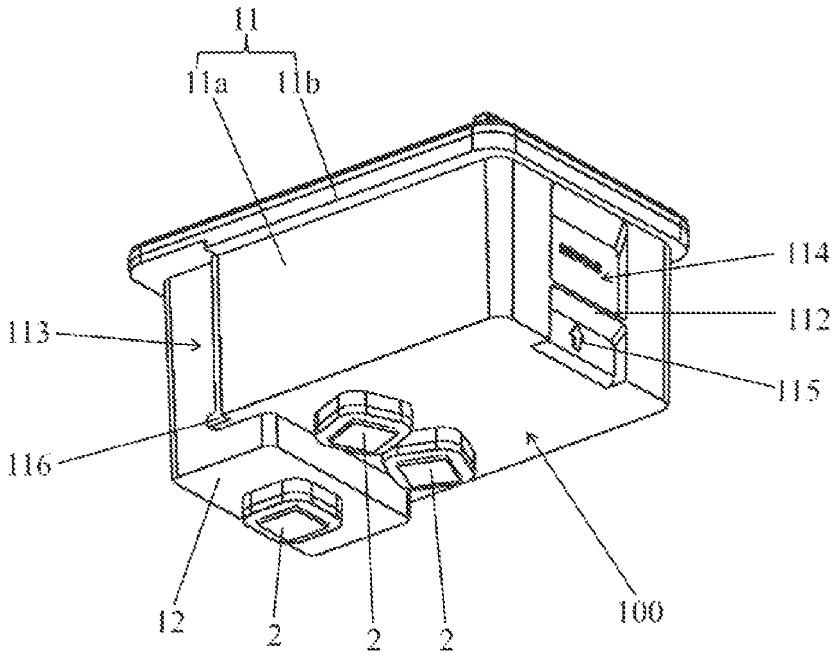
FIG. 2 is a second axonometric view of the ink container according to an embodiment of the present application.
Figure 3:
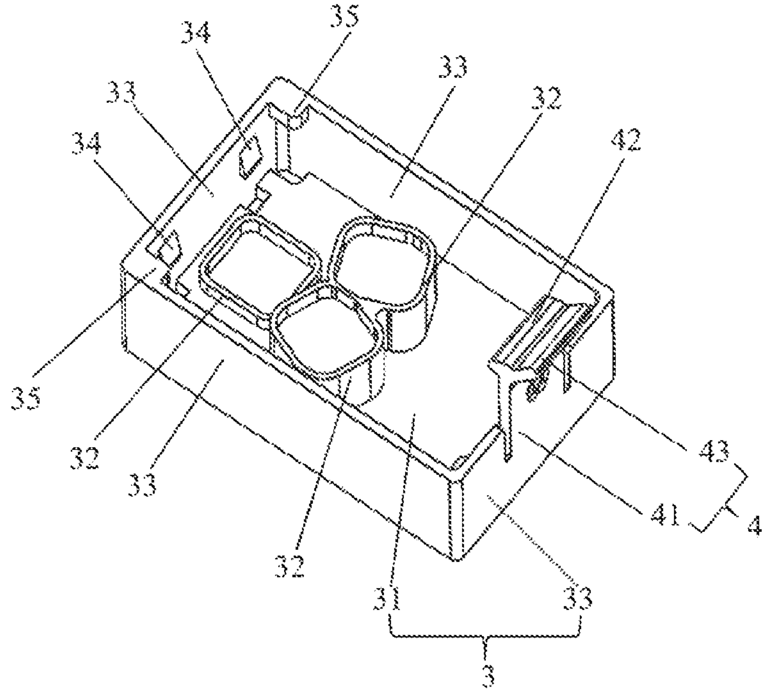
FIG. 3 is an axonometric view of a protection member according to an embodiment of the present application.
Figure 4:
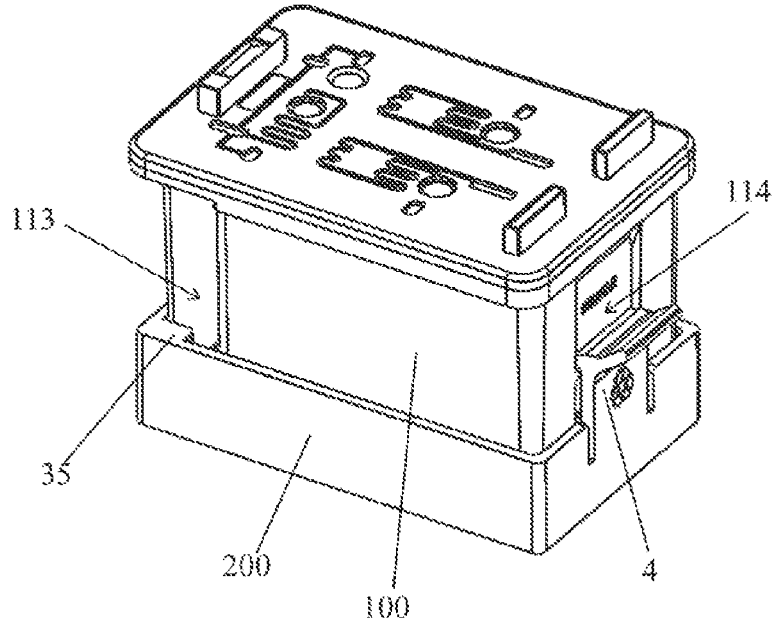
FIG. 4 is a first axonometric view illustrating the connection between the ink container and the protection member according to an embodiment of the present application.
Figure 5:
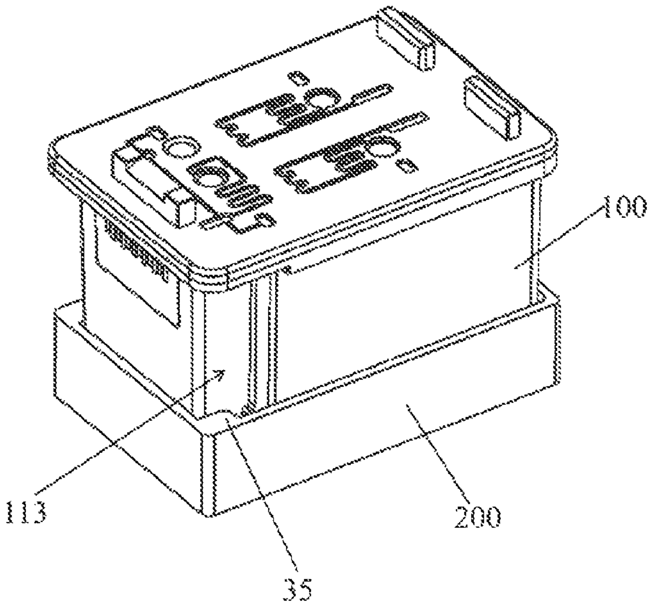
FIG. 5 is a second axonometric view illustrating the connection between the ink container and the protection member according to an embodiment of the present application.

100 ink container
200 protection member
300 ink cartridge
310 cartridge shell
400 mounting member
1 ink container body
2 ink outlet assembly
3 protection body
4 second elastic engagement member
6 first support portion
7 clamping portion
8 first elastic engagement member
9 ink container chip
10 ink cartridge chip
20 connection chip
30 connection member
11 main portion
12 positioning portion
**11*a*** ink storage housing
**11*b*** upper cover
111 second engagement recess
112 second engagement protrusion
113 notch
114 guide recess
115 indication mark
116 first engagement protrusion
117 ink storage cavity
21 ink absorption member
22 connection sleeve
221 sleeve body
222 connection portion
31 mounting portion
32 sealing sleeve
33 limit portion
34 third engagement protrusion
35 protrusion
36 second support portion
41 second elastic arm
42 second hook
43 second toggle portion
51 box body
52 first side plate
53 second side plate
54 third side plate
55 printhead
551 ink entry
541 mounting cavity
61 support body
62 stop portion
611 first support body
612 second support body
6121 recess
613 communication hole
71 first engagement recess
72 second guide surface
81 first elastic arm
82 first hook
83 first toggle portion
201 first region
202 second region
301 first pin
302 second pin
13 fixed portion
14 avoidance recess
15 avoidance cavity
151 cavity opening
16 engagement hole
211 first ink absorption portion
212 second ink absorption portion
2211 first sleeve body portion
2212 second sleeve body portion
2213 third guide surface

DETAILED DESCRIPTION

In the description of the present application, unless otherwise expressly specified and limited, the term "connected to each other", "connected", or "fixed" is to be construed in a broad sense, for example, as fixedly connected, detachably connected, or integrated; mechanically connected or electrically connected: directly connected to each other or indirectly connected to each other via an intermediary; or internally connected between two elements or interaction relations between two elements. For those of ordinary skill in the art, specific meanings of the preceding terms in the present application may be construed according to specific circumstances.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above or over the second feature, or the first feature is obliquely on, above or over the second feature, or the first feature is simply at a higher level than the second feature. When the first feature is described as "under", "below", or "underneath" the second feature, the first feature is right under, below or underneath the second feature or the first feature is obliquely under, below or underneath the second feature, or the first feature is simply at a lower level than the second feature.

In the description of embodiments, it is to be noted that orientations or position relations indicated by terms such as "above", "below", and "right" are based on the drawings. These orientations or position relations are intended only to facilitate the description and simplify the operation and not to indicate or imply that a device or element referred to must have such particular orientations or must be configured or operated in such particular orientations. Thus, these orientations or position relations are not to be construed as limiting the present utility model. In addition, the terms "first" and "second" are used only to distinguish between descriptions and have no special meaning.

As shown in FIGS. 1 to 5, this embodiment provides an ink container assembly. The ink container assembly includes an ink container 100 and a protection member 200. The ink container 100 includes an ink container body 1 and ink outlet assemblies 2. The ink container body 1 includes ink storage cavities 117 configured to store ink. An ink inlet of an ink outlet assembly 2 communicates with an ink storage cavity 117. Illustratively, the ink outlet assembly 2 is disposed on the bottom of the ink container body 1. The ink in the ink storage cavity 117 flows into the ink outlet assembly 2 through the ink inlet of the ink outlet assembly 2 under gravity. The protection member 200 in this embodiment is detachably connected to the ink container 100. During the transportation or storage process of the ink container 100, the protection member 200 is mounted on the ink container 100 and seals an ink outlet of the ink outlet assembly 2, effectively preventing ink leakage. When the ink container 100 needs to be used, the protection member 200 is detached from the ink container 100. Then the ink container 100 is mounted on a mounting member 400 of a cartridge shell 310 of an ink cartridge 300. The ink outlet of the ink outlet assembly 2 communicates with an ink entry 551 of a printhead 55 on the cartridge shell 310 so that the ink container 100 is connected to the cartridge shell 310.

In this embodiment, a first engagement structure is disposed on the ink container body 1. The protection member 200 includes a protection body 3 and a second engagement structure disposed on the protection body 3. The second engagement structure engages with the first engagement structure in a snap-fit manner so that the ink container 100 is detachably connected to the protection member 200, making the structure simple and facilitating the assembling and replacement of the ink container 100.

For example, the first engagement structure includes a second engagement recess 111 and a second engagement protrusion 112 that are disposed on the ink container body 1.

Correspondingly, the second engagement structure includes third engagement protrusions 34 and a second elastic engagement member 4 that are correspondingly disposed on the protection body 3. The third engagement protrusions 34 engage with the second engagement recess 111 in a snap-fit manner. The second elastic engagement member 4 engages with the second engagement protrusion 112 in a snap-fit manner. The second engagement recess 111 and the second engagement protrusion 112 are disposed on two opposite sides of the ink container body 1 respectively. That is, the protection member 200 engages with the ink container body 1 in a snap-fit manner on two ends of the ink container body 1, ensuring the stability of the connection between the protection member 200 and the ink container body 1.

For example, a first guide surface is disposed on a third engagement protrusion 34 and is configured to guide the movement of the third engagement protrusion 34 engaging with the second engagement recess 111 in a snap-fit manner, making the assembling smoother. For example, multiple third engagement protrusions 34 are provided, improving the stability of the connection between the protection member 200 and the ink container 100.

In an embodiment, the second elastic engagement member 4 includes a second elastic arm 41 and a second hook 42 that are connected to each other. The second elastic arm 41 is connected to the protection body 3. The second hook 42 engages with the second engagement protrusion 112 in a snap-fit manner. When the protection member 200 is assembled with the ink container 100, in order to ensure that the third engagement protrusions 34 on the protection member 200 smoothly engage with the second engagement recess 111 on the ink container 100 in a snap-fit manner, an outer wall of the ink container 100 presses the second hook 42, making the second hook 42 drive the second elastic arm 41 to deform in a direction away from the ink container 100. After the third engagement protrusions 34 engage with the second engagement recess 111 in a snap-fit manner, the second elastic arm 41 drives, under the action of the elastic restoring force of the second elastic arm 41, the second hook 42 to engage with the second engagement protrusion 112 in a snap-fit manner.

In this embodiment, a guide recess 114 is disposed on a side surface of the ink container body 1 provided with the second engagement protrusion 112. The second engagement protrusion 112 protrudes from a recess bottom wall of the guide recess 114. The guide recess 114 includes an assembling opening and an avoidance opening. The assembling opening of the guide recess 114 is disposed on a bottom end surface of the ink container body 1. When the ink container 100 is assembled with the protection member 200, the second elastic engagement member 4 extends from the bottom of the ink container 100 into the guide recess 114 through the assembling opening of the guide recess 114. The second elastic engagement member 4 moves upward along the guide recess 114 relative to the ink container 100 until the second hook 42 on the second elastic engagement member 4 engages with the second engagement protrusion 112 in a snap-fit manner. The avoidance opening of the guide recess 114 is opposite to the recess bottom wall of the guide recess 114 and is configured to avoid the movement of the second elastic engagement member 4 in the guide recess 114. The guide recess 114 serves to guide the engagement of the second elastic engagement member 4 with the second engagement protrusion 112 in a snap-fit manner.

An indication mark 115 is disposed on an end of the recess bottom wall of the guide recess 114 close to the assembling opening and is configured to indicate the assembling direction of the second elastic engagement member 4 on the ink container 100, helping a user detach and assemble the ink container 100 and the protection member 200. In this embodiment, the indication mark 115 is an arrow structure.

An end of the guide recess 114 facing away from the assembling opening of the guide recess 114 extends to the upper portion of the ink container body 1. The part of the guide recess 114 located above the second engagement protrusion 112 may serve as a force application space, helping the user extend the hand into the force application space and transfer the ink container 100 under the action of the friction between the hand and a recess wall of the guide recess 114 opposite to the assembling opening of the guide recess 114.

Additionally, the part of the recess bottom wall of the guide recess 114 located above the second engagement protrusion 112 may be configured to mark relevant information such as the model and/or size of the ink container 100.

In another embodiment, the second elastic engagement member 4 further includes a second toggle portion 43 connected to the second elastic arm 41. When the protection member 200 is detached from the ink container 100, the second toggle portion 43 is toggled by an external force. The second toggle portion 43 drives, under the action of the external force, the second elastic arm 41 to deform such that the second hook 42 is detached from the second engagement protrusion 112, facilitating detachment and assembling.

In this embodiment, the second hook 42 and the second toggle portion 43 are each connected to an end of the second elastic arm 41 facing away from the protection body 3 and are disposed on two sides of the second elastic arm 41 respectively.

The second elastic engagement member 4 may be a plastic member with a certain strength and elasticity, ensuring the connection strength between the second elastic engagement member 4 and the ink container 100 and facilitating detachment and assembling.

For example, the protection body 3 includes a mounting portion 31 and sealing sleeves 32. The mounting portion 31 is spaced on the bottom of the ink container 100 and is configured to support the ink container 100. An opening on one end of a sealing sleeve 32 is sealingly connected to the mounting portion 31. Another end of the sealing sleeve 32 is sleeved outside the ink outlet of the ink outlet assembly 2 and supports the ink container body 1. The sealing sleeve 32 and the mounting portion 31 jointly seal the ink outlet of the ink outlet assembly 2 of the ink container 100.

Figure 6:
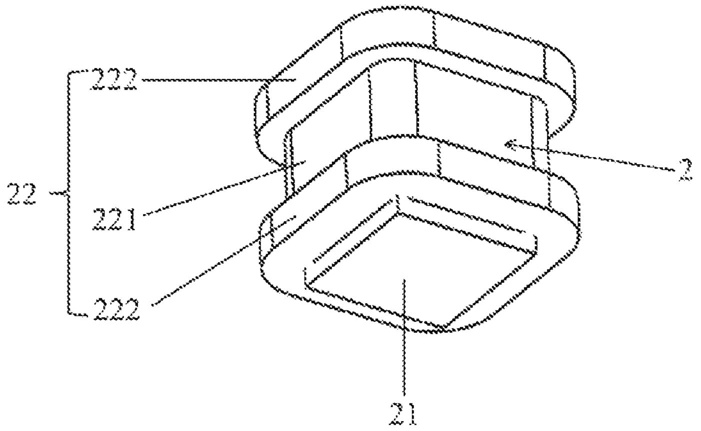
FIG. 6 is an axonometric view of an ink outlet assembly according to an embodiment of the present application.
Figure 7:
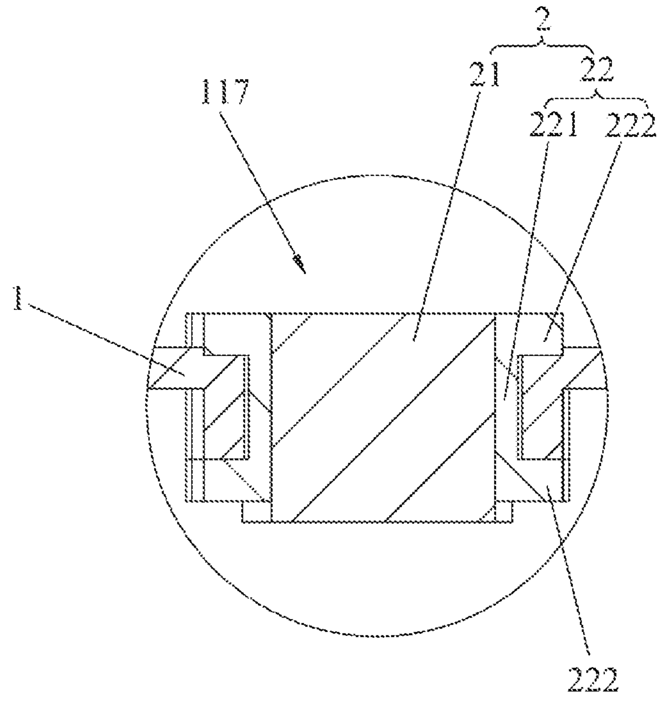
FIG. 7 is a sectional view illustrating the connection between the ink outlet assembly and the ink container according to an embodiment of the present application.
Figure 8:
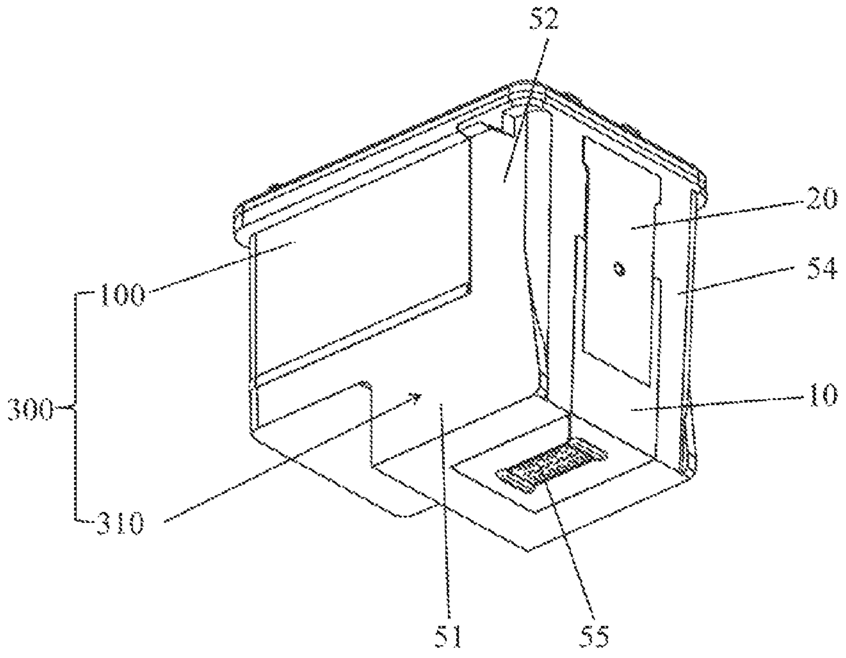
FIG. 8 is an axonometric view of an ink cartridge according to an embodiment of the present application.
Figure 9:
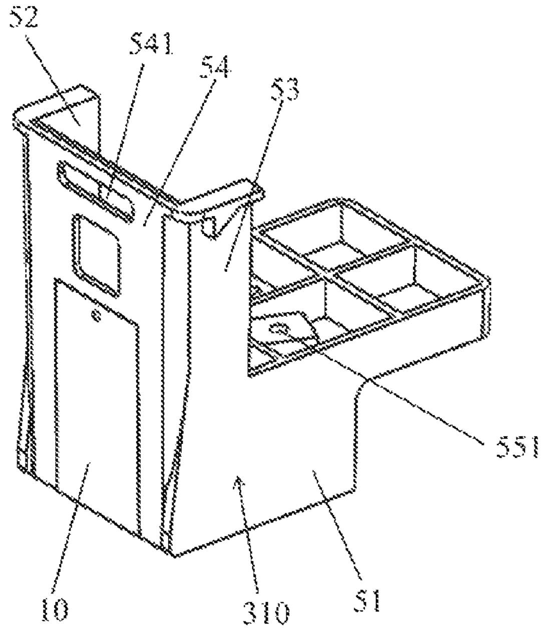
FIG. 9 is an axonometric view of a cartridge shell according to an embodiment of the present application.
Figure 10:
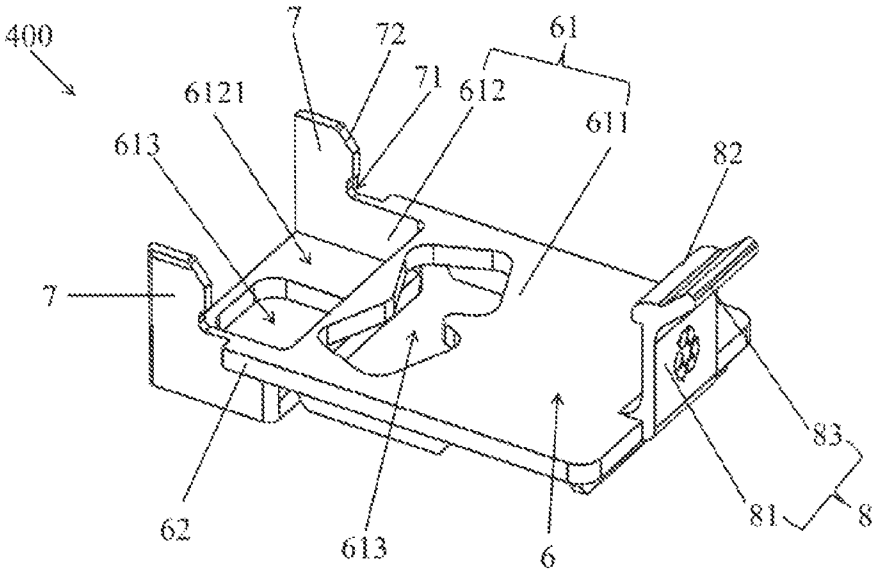
FIG. 10 is an axonometric view of a mounting member according to an embodiment of the present application.
Figure 11:
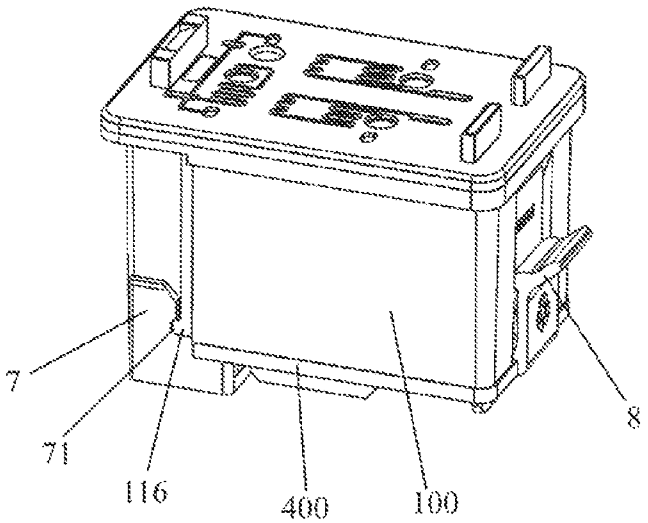
FIG. 11 is an axonometric view illustrating the connection between the ink container and the mounting member according to an embodiment of the present application.
Figure 12:
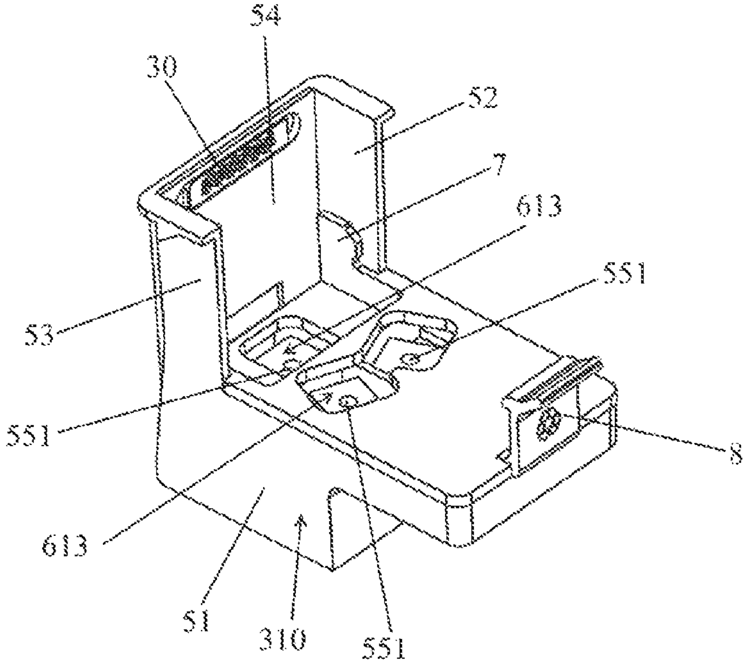
FIG. 12 is a first axonometric view illustrating the connection between the cartridge shell and the mounting member according to an embodiment of the present application.
Figure 13:
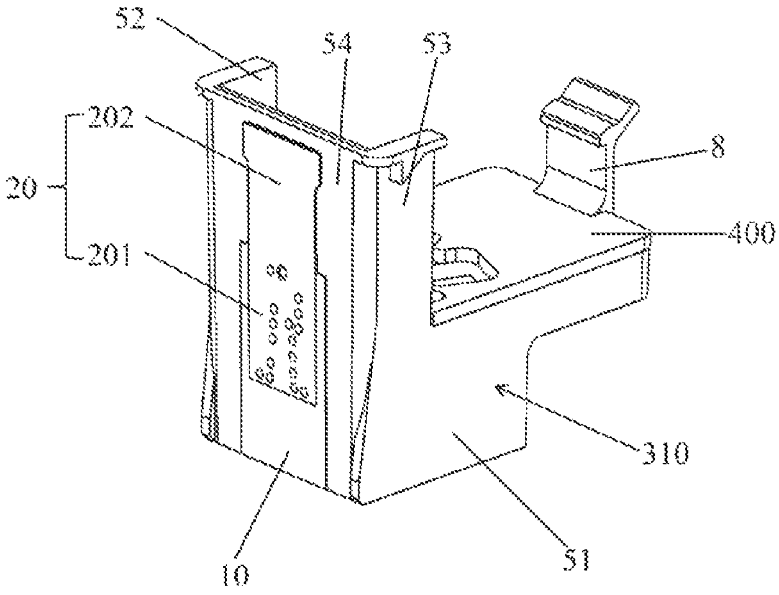
FIG. 13 is a second axonometric view illustrating the connection between the cartridge shell and the mounting member according to an embodiment of the present application.

Illustratively, as shown in FIGS. 6 and 7, the ink outlet assembly 2 includes an ink absorption member 21 and a connection sleeve 22 sleeved outside the ink absorption member 21. For example, the connection sleeve 22 includes a sleeve body 221 and connection portions 222. The sleeve body 221 is a hollow and open-ended structure. The sleeve body 221 is sleeved outside the ink absorption member 21. The connection portions 222 protrude out of outer walls of two end openings of the sleeve body 221 respectively. A connection portion 222 is an annular structure. In the case where the sleeve body 221 is compressed, a connection portion 222 on the upper end of the sleeve body 221 can extend into the ink storage cavity 117 through an ink outlet opening of the ink storage cavity 117 such that one end of the ink absorption member 21 is exposed in the ink storage cavity 117. The size of the connection portion 222 and the size of the sleeve body 221 are each greater than the size of the ink outlet opening. The middle portion of the sleeve body 221 engages with the ink outlet opening in a snap-fit manner in the compression state. Moreover, the connection portion 222 extending into the ink storage cavity 117 can prevent the connection sleeve 22 from falling off from the ink container body 1. A connection portion 222 of the connection sleeve 22 located outside the ink container body 1 is sleeved on the preceding sealing sleeve 32. The ink in the ink storage cavity 117 can flow out through the ink absorption member 21.

The connection sleeve 22 may be made of, for example, rubber or silica gel and has a certain strength and elasticity. The ink absorption member 21 may be a sponge capable of adsorbing and storing certain ink. The sealing sleeve 32 may also be of, for example, rubber or silica gel to ensure the sealing performance at connection places between the sealing sleeve 32 and the connection portions 222.

For example, the protection body 3 further includes a limit portion 33. The limit portion 33 is connected to the mounting portion 31 and is disposed around the outer circumferential direction of the ink container body 1. The preceding third protrusion recess 34 and the second elastic engagement member 4 are disposed on two opposite side walls of the limit portion 33 respectively. The arrangement of the limit portion 33 increases the contact area between the protection member 200 and the ink container body 1, improves the stability of the connection between the protection member 200 and the ink container 100, and prevents the ink container 100 from shaking relative to the mounting portion 31 during the transportation process. In other embodiments, the limit portion 33 may also be disposed only on two opposite side walls of the ink container body 1.

In an embodiment, notches 113 are disposed on an outer wall of the ink container body 1. Protrusions 35 are disposed correspondingly on the limit portion 33. The protrusions 35 engage with the notches 113 in a snap-fit manner, preventing the ink container 100 from shaking relative to the protection member 200 during the transportation process.

The protection member 200 is detachably connected to the ink container 100. During the transportation or storage process of the ink container 100, the protection member 200 is mounted on the ink container 100 and seals the ink outlet of the ink outlet assembly 2, effectively preventing ink leakage. When the ink container 100 needs to be used, the protection member 200 is detached from the ink container 100. Then the ink container 100 is mounted on the printing equipment. The ink outlet of the ink outlet assembly 2 communicates with an ink entry 551 of a printhead 55 of the printing device to supply the ink to the printing equipment.

As shown in FIGS. 8 to 13, this embodiment further provides an ink cartridge 300. The ink cartridge 300 includes a cartridge shell 310 and the preceding ink container 100. The printhead 55 and the mounting member 400 are disposed on the cartridge shell 310. After the preceding ink container assembly is detached (that is, after the protection member 200 is detached from the ink container 100), the ink container 100 is mounted on the mounting member 400 and the ink outlet of the ink outlet assembly 2 of the ink container 100 is made to communicate with the ink entry 551 of the printhead 55 on the cartridge shell 310 so that the ink container 100 is connected to the cartridge shell 310. The ink container 100 is detachably connected to the mounting member 400. After the ink runs out, the ink container 100 is separated from the mounting member 400 and a new ink container 100 is replaced, implementing the reuse of the cartridge shell 310. The effective utilization of the cartridge shell 310 saves cost, saves energy, and protects the environment.

In this embodiment, the mounting member 400 is disposed on the cartridge shell 310 and is connected to the ink container 100 so that the ink container 100 is connected to the cartridge shell 310. Therefore, no connection structure needs to be processed on the cartridge shell 310 to match the ink container 100, simplifying the processing technique, resulting in a high structural strength of the cartridge shell 310, preventing the printhead 55 from being damaged, and prolonging the service life of the cartridge shell 310.

For example, the mounting member 400 includes a first support portion 6. The first support portion 6 is disposed on the bottom of the ink container body 1 and is configured to support the ink container body 1. A communication hole 613 is disposed on the first support portion 6. The communication hole 613 communicates with the ink entry 551 of the printhead 55. The connection portion 222 of the ink outlet assembly 2 located outside the ink container body 1 extends into the communication hole 613 such that the ink outlet of the ink outlet assembly 2 communicates with the ink entry 551 of the printhead 55. The ink in the ink storage cavity 117 flows into the ink absorption member 21 of the ink outlet assembly 2 through the ink inlet of the ink outlet assembly 2 under the action of gravity and then flows into the ink entry 551 of the printhead 55 opposite to the ink outlet through the ink outlet of the ink outlet assembly 2 to supply the ink to the printhead 55. Through the communication hole 613 on the first support portion 6, the first support portion 6 matches the connection portion 222 of the ink outlet assembly 2 located outside the ink container body 1 so as to position the mounting of the ink container 100 on the mounting member 400, ensure that the ink outlet of the ink outlet assembly 2 is opposite to the ink entry 551 of the printhead 55.

The mounting member 400 further includes a clamping assembly configured to clamp the ink container body 1. The clamping assembly includes two clamping portions 7 connected to the first support portion 6. The two clamping portions 7 are respectively disposed on two opposite sides of the ink container body 1 to clamp the ink container 100. The arrangement of the clamping assembly increases the contact area between the mounting member 400 and the ink container body 1 and improves the stability of the connection between the mounting member 400 and the ink container body 1. In this embodiment, a clamping portion 7 is located at a notch 113 of the ink container body 1. The clamping portion 7 is inserted into the notch 113 from the bottom of the ink container body 1. The notch 113 is configured to position the connection between the clamping portion 7 and the ink container body 1.

For example, a first engagement recess 71 is disposed on the clamping portion 71. A first engagement protrusion 116 is correspondingly disposed on the ink container body 1. The first engagement protrusion 116 faces the notch 113 and engages with the first engagement recess 71 in a snap-fit manner, improving the stability of the connection between the mounting member 400 and the ink container body 1. A second guide surface 72 is disposed on the clamping portion 7 and is configured to guide the movement of the first engagement protrusion 116 engaging with the first engagement recess 71 in a snap-fit manner.

The mounting member 400 further includes a first elastic engagement member 8 connected to the first support portion 6. The first elastic engagement member 8 engages with the second engagement protrusion 112 of the ink container body 1 in a snap-fit manner so that the mounting member 400 is connected to the ink container body 1.

In an embodiment, the first elastic engagement member 8 includes a first elastic arm 81 and a first hook 82 that are connected to each other. The first elastic arm 81 is connected to the first support portion 6. The first hook 82 engages with the second engagement protrusion 112 in a snap-fit manner. When the mounting member 400 is assembled with the ink container 100, in order to ensure that the first engagement protrusion 116 on the ink container body 1 smoothly engages with the first engagement recess 71 on the mounting member 400 in a snap-fit manner, the outer wall of the ink container body 1 presses the first hook 82, making the first hook 82 drive the first elastic arm 81 to deform in a direction away from the ink container body 1. After the first engagement protrusion 116 engages with the first engagement recess 71 in a snap-fit manner, the first elastic arm 81 drives, under the action of the elastic restoring force of the first elastic arm 81, the first hook 82 to engage with the second engagement protrusion 112 in a snap-fit manner.

Similar to the preceding mounting manner of the second elastic engagement member 4, the first elastic engagement member 8 extends from the bottom of the ink container body 1 into the guide recess 114 through the assembling opening of the guide recess 114. The first elastic engagement member 8 moves upward along the guide recess 114 relative to the ink container body 1 until the first hook 82 on the first elastic engagement member 8 engages with the second engagement protrusion 112 of the ink container body 1 in a snap-fit manner. The avoidance opening of the guide recess 114 is opposite to the recess bottom wall of the guide recess 114 and is configured to avoid the movement of the first elastic engagement member 8 in the guide recess 114. The guide recess 114 serves to guide the engagement of the first elastic engagement member 8 with the second engagement protrusion 112 in a snap-fit manner.

In another embodiment, the first elastic engagement member 8 further includes a first toggle portion 83 connected to the first elastic arm 81. When the mounting member 400 is detached from the ink container 100, the first toggle portion 83 is toggled by an external force. The first toggle portion 83 drives, under the action of the external force, the first elastic arm 81 to deform such that the first hook 82 is detached from the second engagement protrusion 112, facilitating detachment and assembling.

In this embodiment, the first hook 82 and the first toggle portion 83 are each connected to an end of the first elastic arm 81 facing away from the protection body 3 and are disposed on two sides of the first elastic arm 81 respectively.

For example, the first support portion 6 includes a support body 61. The support body 61 is disposed on the bottom of the ink container body 1 and is configured to support the ink container body 1. The support body 61 includes a first end and a second end that are opposite to each other. The first elastic engagement member 8 is connected to the first end of the first support portion 6. The two clamping portions 7 of the clamping assembly are disposed on two sides of the second end of the first support portion 6 respectively. The mounting member 400 is connected to the ink container body 1 on two opposite ends of the ink container body 1 through the clamping assembly and the first elastic engagement member 8, ensuring the stable connection between the mounting member 400 and the ink container body 1.

In this embodiment, the clamping assembly of the mounting member 400 clamps the ink container body 1 in a first direction. The first engagement recess 71 on the clamping portion 7 engages with the first engagement protrusion 116 of the ink container body 1 in a snap-fit manner in a second direction. Moreover, the first hook 82 the first elastic engagement member 8 of the mounting member 400 engages with the second engagement protrusion 112 in a snap-fit manner in the second direction. The mounting member 400 limits the ink container body 1 in a third direction through the first elastic engagement member 8 and the matching of the clamping portion 7 with the first engagement protrusion 116, finally implementing the stable connection between the mounting member 400 and the ink container body 1.

For example, the cartridge shell 310 includes a box body 51, a first side plate 52, and a second side plate 53. The first side plate 52 and the second side plate 53 are connected to the box body 51. The preceding printhead 55 is disposed on the box body 51. The support body 61 of the mounting member 400 is mounted on the box body 51. The first side plate 52 and the second side plate 53 are spaced apart on the box body 51, are disposed on the two sides of the second end of the support body 61 respectively, and clamp the clamping assembly of the mounting member 400. The first side plate 52 and the second side plate 53 clamp the clamping assembly of the mounting member 400 so as to position the mounting of the mounting member 400 on the box body 51.

In this embodiment, the first support portion 6 further includes stop portions 62 protruding from two sides of the support body 61. The first side plate 52 and the second side plate 53 each abut against a corresponding stop portion 62 so as to position the mounting of the mounting member 400 on the box body 51, improving the mounting accuracy of the mounting member 400 on the box body 51.

The cartridge shell 310 further includes a third side plate 54 connected to the box body 51. An end surface of the second end of the support body 61 of the mounting member 400 and/or an end of the clamping portion 7 facing away from the first end of the support body 61 abuts against the third side plate 54 so as to position the mounting of the mounting member 400 on the box body 51.

In this embodiment, a recess 6121 is disposed on the support body 61. The ink container body 1 includes a positioning portion 12. The positioning portion 12 engages with the recess 6121 in a snap-fit manner so as to position the mounting of the ink container body 1 on the support body 61, improving the mounting accuracy of the ink container 100 on the mounting member 400.

For example, the support body 61 includes a first support body 611 and a second support body 612. The ink container body 1 further includes a main portion 11. The positioning portion 12 is connected to the bottom of the main portion 11. The first support body 611 supports the main portion 11. The recess 6121 is disposed on the second support body 612. The preceding first elastic engagement member 8 is disposed on the first support body 611. The clamping portions 7 are disposed on the second support body 612. The stop portions 62 are disposed on two sides of the first support body 611 and extend to the second support body 612.

For example, the mounting member 400 is an integral injection molding member with simple manufacturing technique and high production efficiency.

The mounting member 400 adheres to the cartridge shell 310 with no need for an assembling hole on the mounting member 400 or the cartridge shell 310, improving the structural strength of the mounting member 400 and the structural strength of the cartridge shell 310.

It is to be noted that the number of ink storage cavities 117 is related to the type of the ink cartridge 300 (for example, a monochrome ink cartridge or a color ink cartridge). Each ink storage cavity 117 is provided with at least one ink outlet assembly 2. The number of ink storage cavities 117 may be set reasonably according to the type of the ink cartridge 300. Moreover, the mounting position of each ink storage cavity 117 on the ink container body 1 may be arranged reasonably.

Figure 14:
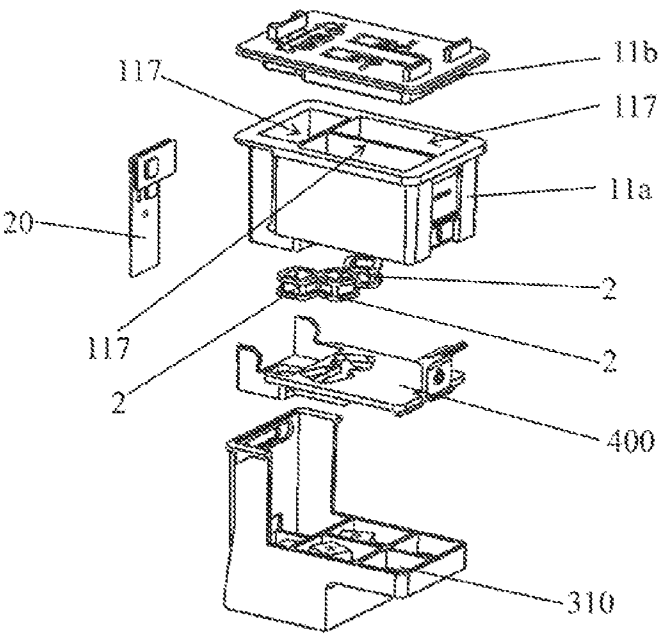
FIG. 14 is an exploded view of the ink cartridge (color ink cartridge) according to an embodiment of the present application.

In this embodiment, referring to FIG. 14, the ink cartridge 300 is a color ink cartridge. The ink container 100 includes three ink storage cavities 117. The three ink storage cavities 117 are each disposed on the main portion 11. One ink storage cavity 117 penetrates through the positioning portion 12. One ink outlet assembly 2 is disposed on the bottom of each ink storage cavity 117.

Figure 15:
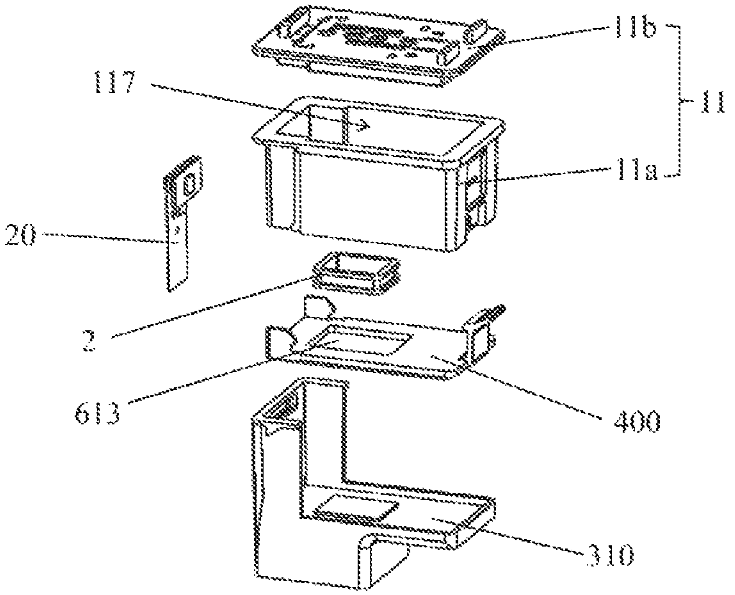
FIG. 15 is an exploded view of an ink cartridge (monochrome ink cartridge) according to an embodiment of the present application.

In an embodiment, referring to FIG. 15, the ink cartridge 300 may also be a monochrome ink cartridge. The ink container 100 includes one ink storage cavity 117. The ink storage cavity 117 is disposed on the main portion 11. One ink outlet assembly 2 is disposed on the bottom of the ink storage cavity 117.

Figure 16:
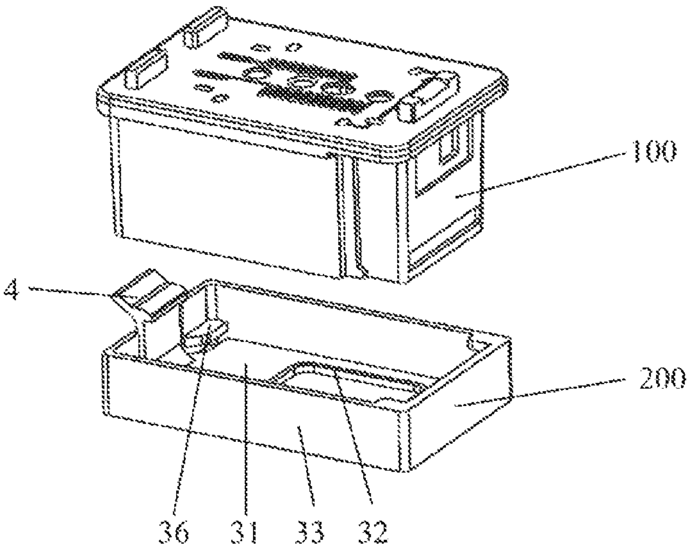
FIG. 16 is a view of the ink container and the protection member according to an embodiment of the present application.
Figure 17:
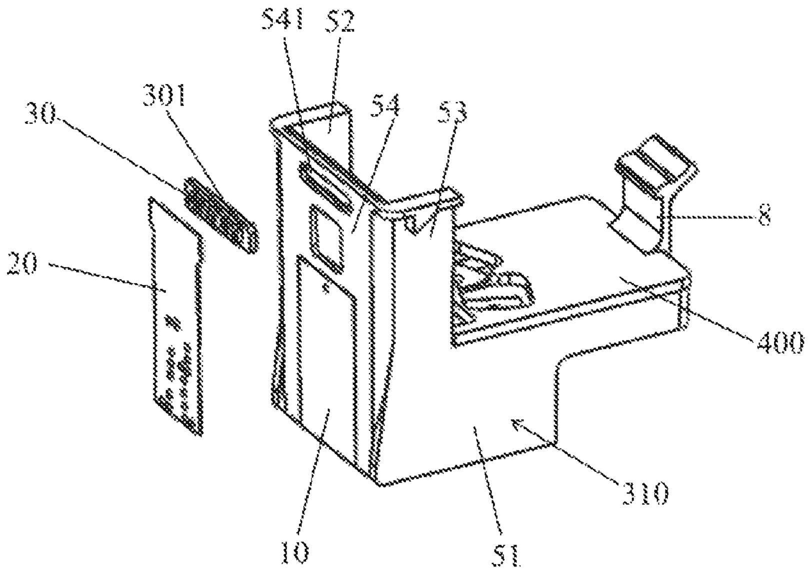
FIG. 17 is view one of the cartridge shell, a connection chip, a connection member, and the mounting member according to an embodiment of the present application.
Figure 18:
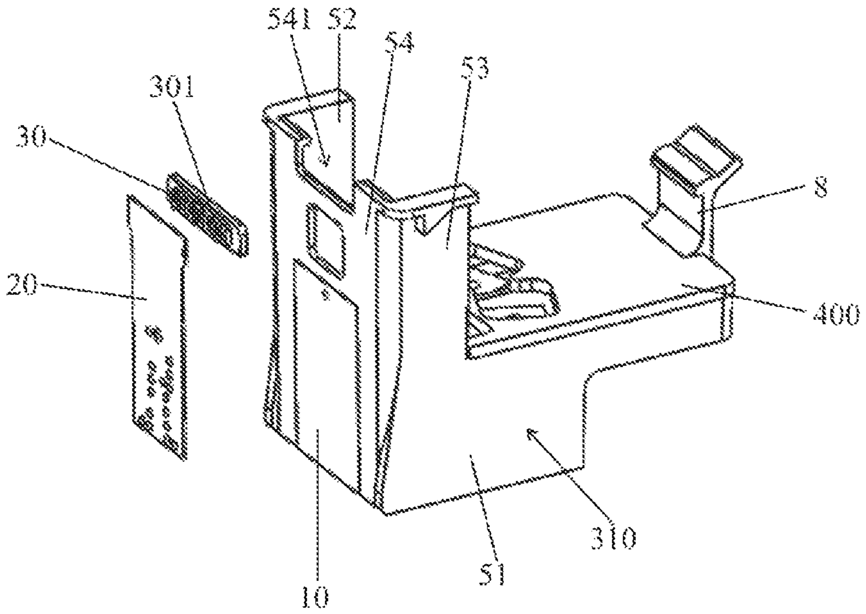
FIG. 18 is view two of the cartridge shell, the connection chip, the connection member, and the mounting member according to an embodiment of the present application.
Figure 19:
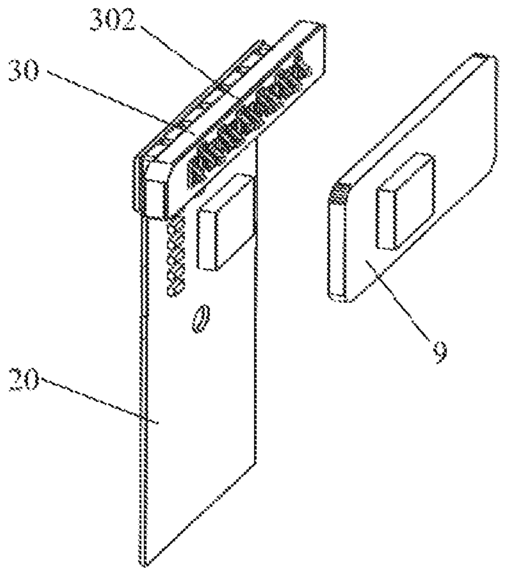
FIG. 19 is a view of the connection chip, the connection member, and an ink container chip according to an embodiment of the present application.
Figure 20:
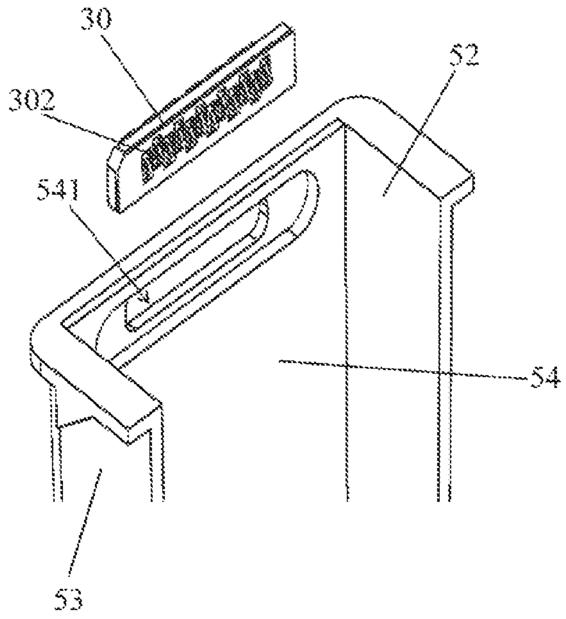
FIG. 20 is a view illustrating the partial structure of the connection member and the cartridge shell according to an embodiment of the present application.
Figure 21:
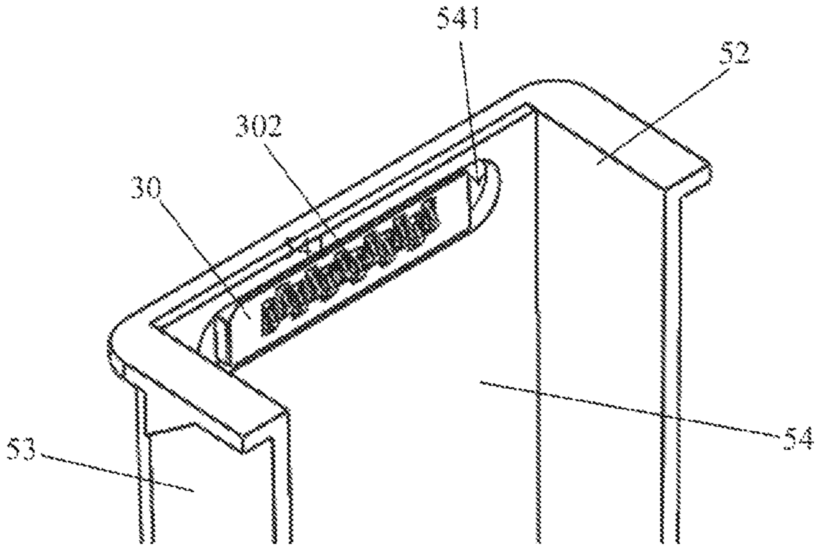
FIG. 21 is a view illustrating the mounting of the connection member on the cartridge shell according to an embodiment of the present application.

It is to be noted that, referring to FIG. 16, for the mounting of the ink container 100 and the preceding protection member 200, the positioning portion 12 protrudes from the bottom of the main portion 11, the ink outlet assembly 2 protrudes from the bottom of the ink container body 1, and/or the sealing sleeve 32 protrudes from the mounting portion 31 of the protection member 200. Accordingly, the ink container 100 is easily inclined in the protection member 200 or easily shakes in the protection member 200. For this reason, a second support portion 36 protrudes from an inner wall of the limit portion 33 of the protection member 200 to be configured to support the ink container body 1, ensuring that the ink container 100 is stably placed in the protection member 200 and preventing the ink container 100 from being inclined and causing ink leakage. In other embodiments, the second support portion 36 may also protrude from a side of the mounting portion 31 facing the ink container body 1.

For example, referring to FIGS. 14 and 15, the main portion 11 further includes an ink storage housing 11*a* and an upper cover 11*b*. The ink storage cavity 117 is disposed on the ink storage housing 11*a*. An upper end opening of the ink storage cavity 117 penetrates through an upper surface of the ink storage housing 11*a*. The upper cover 11*b* is connected to the ink storage housing 11*a* and seals the upper end opening of the ink storage cavity 117. The upper cover 11*b* is detachably connected to the ink storage housing 11*a*, convenient for the ink to be injected into the ink storage cavity 117.

In this embodiment, referring to FIGS. 17 to 21, the ink container 100 further includes an ink container chip 9. The ink container chip 9 is disposed on a side of the ink container body 1 facing the third side plate 54. The cartridge shell 310 further includes an ink cartridge chip 10 and a connection chip 20. The ink cartridge chip 10 and the connection chip 20 are each disposed on a side of the third side plate 54 facing away from the ink container body 1. The ink cartridge chip 10 is connected to the third side plate 54. The connection chip 20 includes a first region 201 and a second region 202. A contact on the first region 201 is electrically connected to the ink cartridge chip 10. The second region 202 is configured to be electrically connected to the ink container chip 9. A mounting cavity 541 is disposed on the third side plate 54 and corresponds to the second region 202. A connection member 30 is disposed in the mounting cavity 541. The connection member 30 includes a first pin 301 and a second pin 302. The first pin 301 is electrically connected to a contact on the second region 202. The second pin 302 is electrically connected to a contact on the ink container chip 9.

The mounting cavity 541 may be a closed cavity structure (FIG. 17) disposed on the third side plate 54 or may be an edge cavity structure (FIG. 18) disposed on the third side plate 54. The closed cavity structure refers to that the entire circumferential direction of the mounting cavity 541 is surrounded by the solid third side plate 54. The edge cavity structure refers to that the mounting cavity 541 penetrates through the edge of the third side plate 54.

In an ink cartridge in the related art, an ink cartridge chip 10 is directly electrically connected to the ink container chip 9 in general. A connection hole is disposed on an outer side wall of a cartridge shell 310. A partial region of the ink cartridge chip 10 extends into the connection hole to make a contact on the partial region be in contact with and electrically connected to a corresponding contact on the ink container chip 9. However, due to a certain thickness of the cartridge shell 310, the processing height of the contact on the ink cartridge chip 10 and the mounting accuracy of the ink cartridge chip 10 in the connection hole need to be strictly controlled in a combination of factors such as the wall thickness of the cartridge shell 310 so that the contact on the ink cartridge chip 10 can be in contact with the contact on the ink container chip 9 effectively and a problem that the contact on the ink cartridge chip 10 has a copper crack at a protrusion potion or is collapsed due to severe friction caused by replacing the ink container 100 for many times, affecting the production technique and the assembling technique and resulting in high production cost.

The ink cartridge 300 of this embodiment is additionally provided with the connection chip 20 and the connection member 30. The second region 202 of the connection chip 20 is electrically connected to the ink container chip 9 through the connection member 30 so that both the requirements for the processing accuracy of the height of the contact on the connection chip 20 and the height of the contact on the ink container chip 9 and the requirements for the accuracy of the relative mounting position of the connection chip 20 and the ink container chip 9 are low. Moreover, it ensures that the connection chip 20 is electrically connected to the ink container chip 9 effectively, resulting in low production cost.

Figure 22:
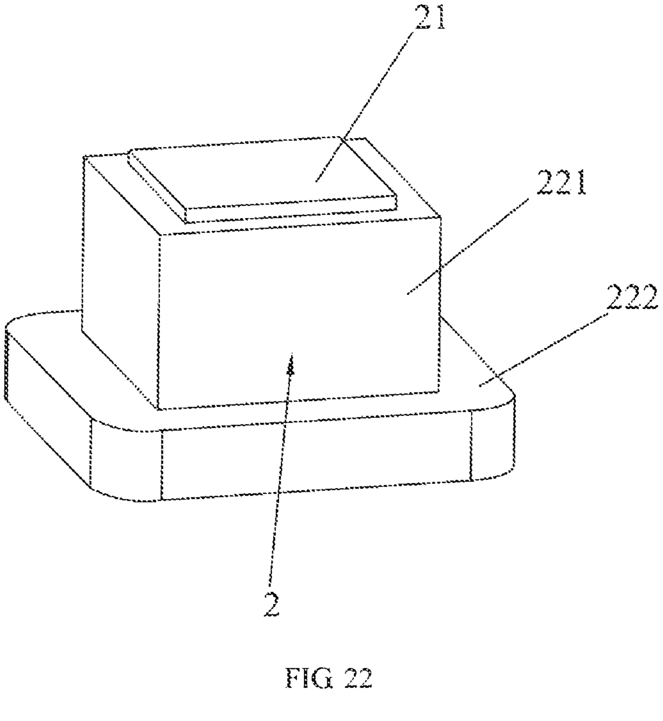
FIG. 22 is an axonometric view of another ink outlet assembly according to an embodiment of the present application.
Figure 23:
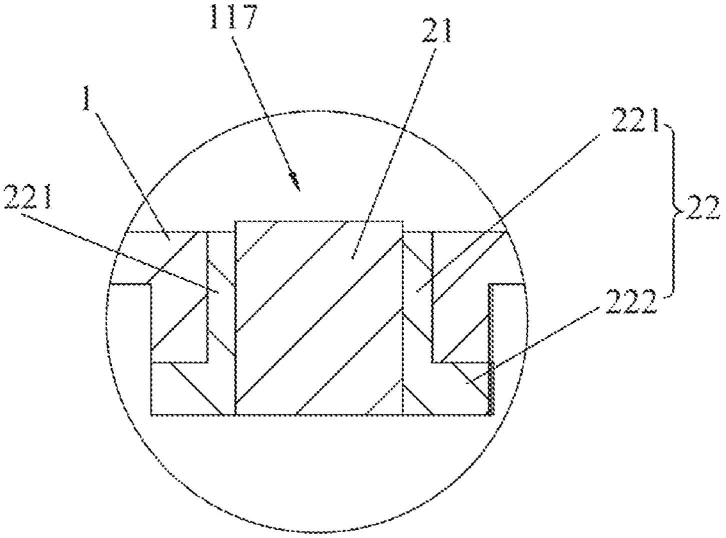
FIG. 23 is a sectional view illustrating the connection between another ink outlet assembly and the ink container according to an embodiment of the present application.

As shown in FIGS. 22 and 23, the difference between this embodiment and the preceding embodiments lies in that the structure of the ink outlet assembly 2 is different. The ink outlet assembly 2 in this embodiment includes a connection sleeve 22 and an ink absorption member 21. The connection sleeve 22 is sleeved outside the ink absorption member 21. The connection sleeve 22 includes a sleeve body 221 and one connection portion 222. The sleeve body 221 is a hollow and open-ended structure. The sleeve body 221 is sleeved outside the ink absorption member 21. An end of the sleeve body 221 extends into the ink storage cavity 117 through the ink outlet opening of the ink storage cavity 117. The connection portion 222 is connected to an end of the sleeve body 221 located outside the ink storage cavity 117. The size of the connection portion 222 and the size of the sleeve body 221 are each greater than the size of the ink outlet opening. The upper end of the sleeve body 221 engages with the ink outlet opening in a snap-fit manner in the compression state. The connection portion 222 is configured to be sleeved on the sealing sleeve 32.

Figure 24:
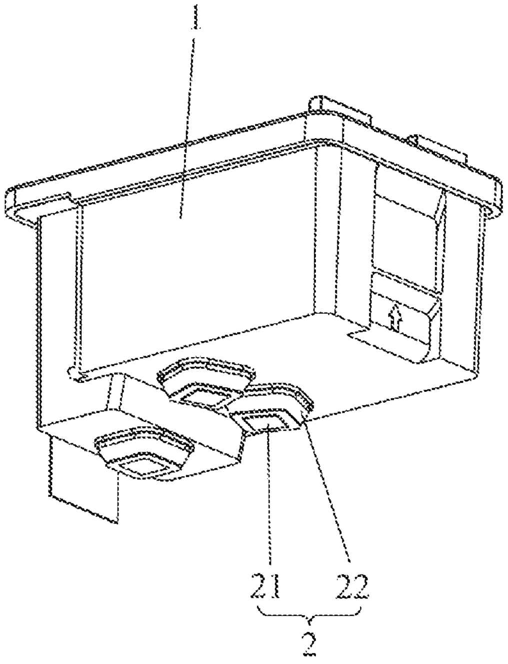
FIG. 24 is an axonometric view illustrating the connection between another ink outlet assembly and the ink container according to an embodiment of the present application.
Figure 25:
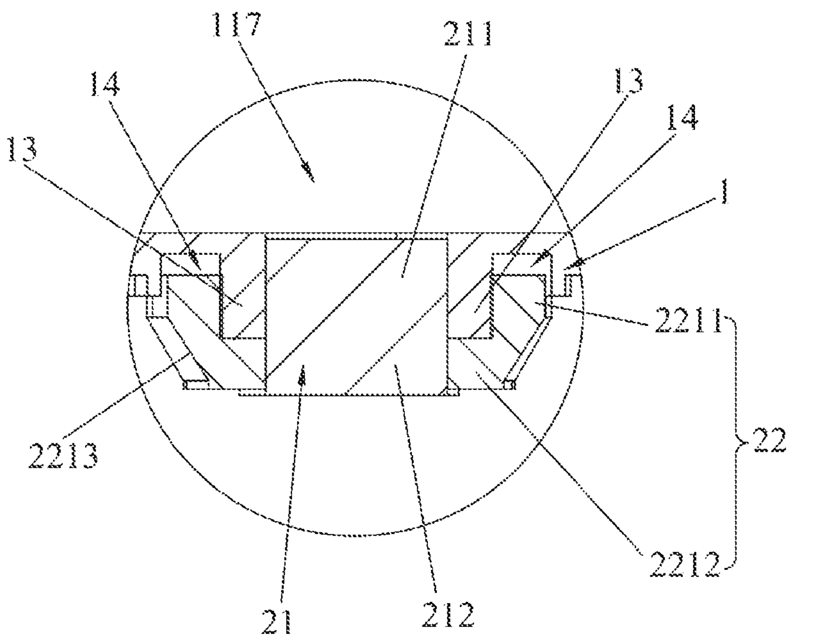
FIG. 25 is a sectional view illustrating the connection between another ink outlet assembly and the ink container according to an embodiment of the present application.
Figure 26:
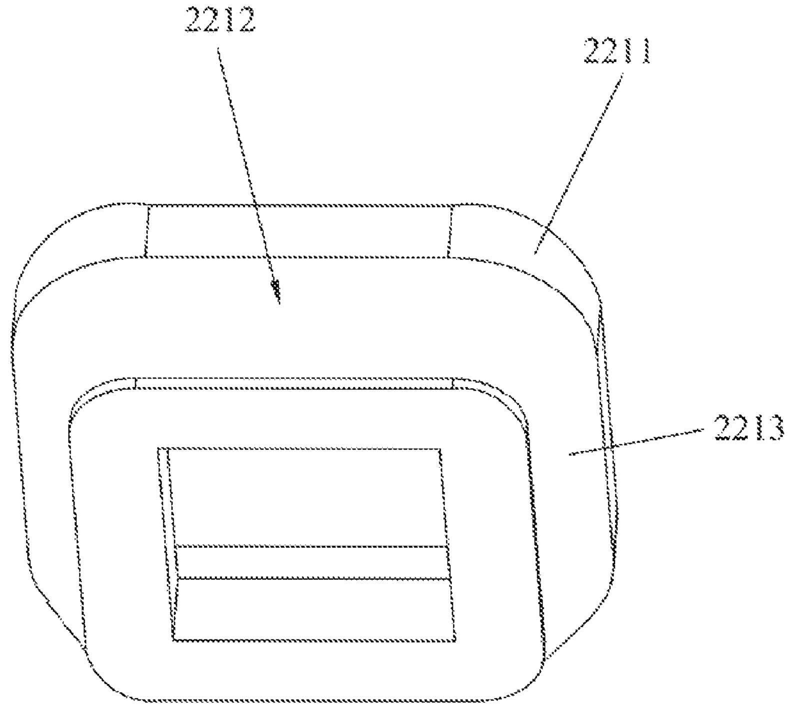
FIG. 26 is a first axonometric view of another ink outlet assembly according to an embodiment of the present application.
Figure 27:
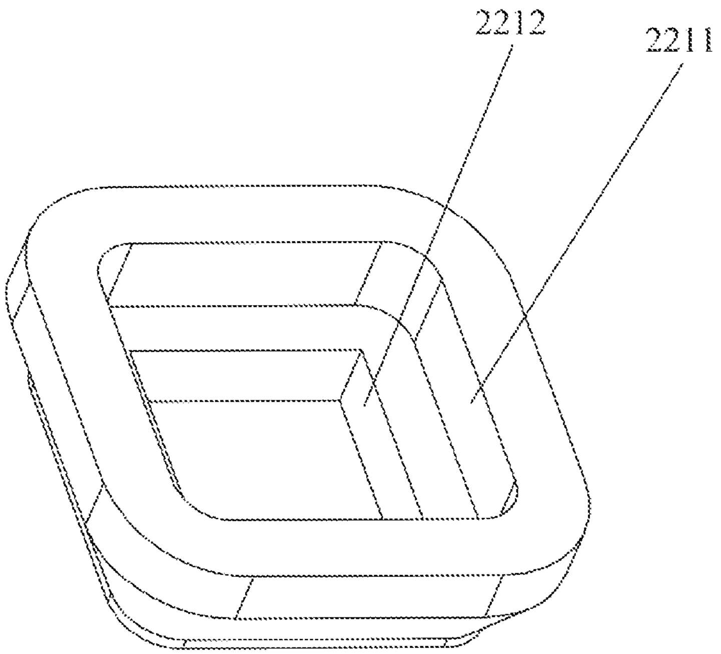
FIG. 27 is a second axonometric view of another ink outlet assembly according to an embodiment of the present application.
Figure 28:
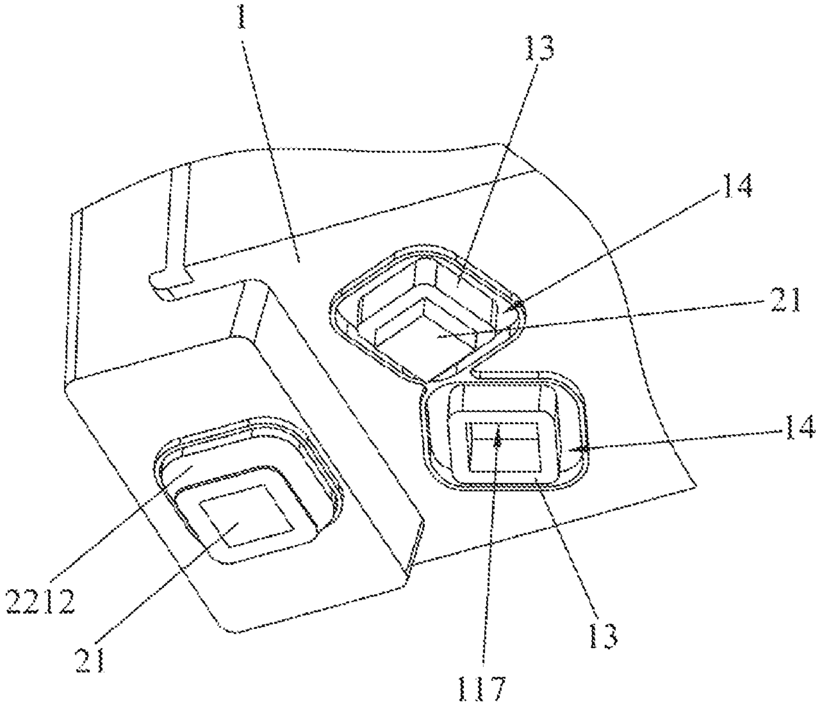
FIG. 28 is a view illustrating the partial structure of another ink outlet assembly and the ink container according to an embodiment of the present application.

As shown in FIGS. 24 and 28, the difference between this embodiment and the preceding embodiments lies in that the structure of the ink outlet assembly 2 is different. The ink outlet assembly 2 in this embodiment includes a connection sleeve 22 and an ink absorption member 21. The connection sleeve 22 includes a first sleeve body portion 2211 and a second sleeve body portion 2212. The size of the first sleeve body portion 2211 is greater than the size of the second sleeve body portion 2212 and the size of the ink absorption member 21. A fixed portion 13 protrudes from the outer wall of the ink container body 1 and at the ink outlet opening of the ink storage cavity 117. The fixed portion 13 is annular and is disposed in the circumferential direction of the ink outlet opening. An avoidance recess 14 is disposed on the ink container body 1 and in the outer circumferential direction of the fixed portion 13. The first sleeve body portion 2211 extends into the avoidance recess 14 and is tightly sleeved on the fixed portion 13 so that the connection sleeve 22 is connected to the ink container body 1. The ink absorption member 21 includes a first ink absorption portion 211 and a second ink absorption portion 212 that are connected to each other. The first ink absorption portion 211 is tightly sleeved inside the fixed portion 13. The second ink absorption portion 212 is tightly sleeved inside the second sleeve body portion 2212.

The second sleeve body portion 2212 located outside the avoidance recess 14 is configured to be sleeved on the sealing sleeve 32. For example, a third guide surface 2213 is disposed on the second sleeve body portion 2212, convenient for the second sleeve body portion 2212 to be placed in the sealing sleeve 32.

Figure 29:
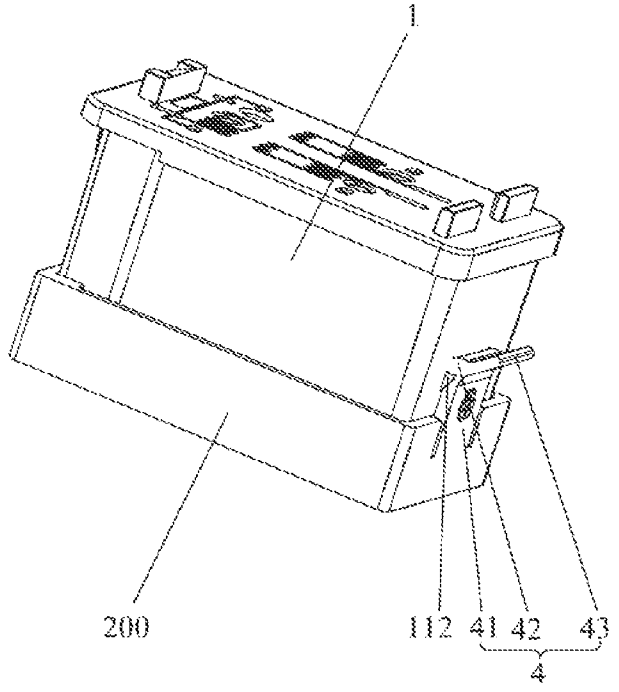
FIG. 29 is an axonometric view of another ink container and the protection member according to an embodiment of the present application.
Figure 30:
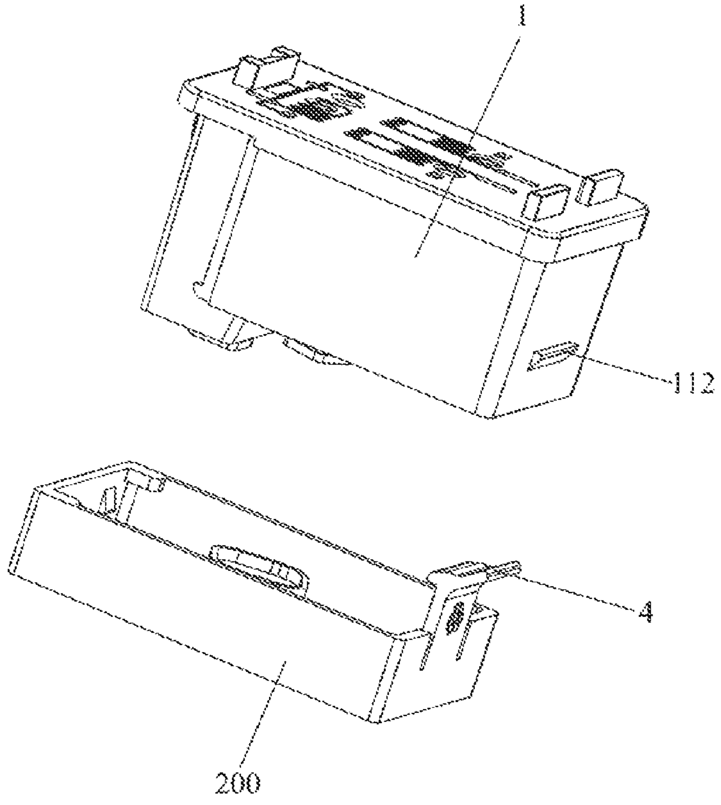
FIG. 30 is an exploded view of another ink container and the protection member according to an embodiment of the present application.
Figure 31:
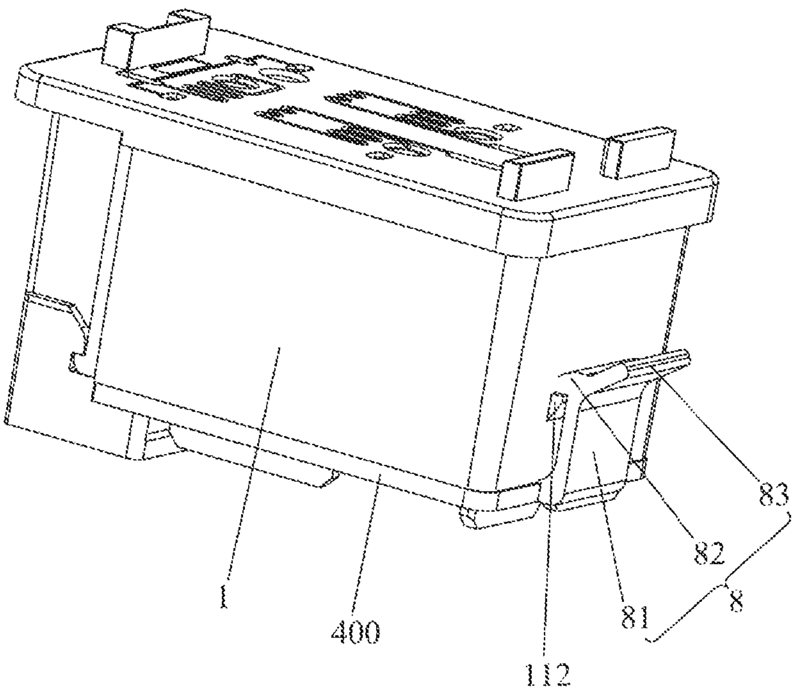
FIG. 31 is an axonometric view of another ink container and the mounting member according to an embodiment of the present application.

As shown in FIGS. 29 and 31, the difference between this embodiment and the preceding embodiments lies in that the structure of the ink outlet assembly 1 is different. In the ink container body 1 in this embodiment, the second engagement protrusion 112 protrudes from an outer surface of the ink container body 1. The ink container body 1 directly engages with the second elastic engagement member 4 on the protection member 2 or the first elastic engagement member 8 on the mounting member 400 in a snap-fit manner through the second engagement protrusion 112 on the outer surface of the ink container body 1. Compared with the preceding embodiments, no guide recess 114 is disposed on the side surface of the ink container body 1 in this embodiment provided with the second engagement protrusion 112. The ink container body 1 in this embodiment has a simpler structure, is more convenient to process, and has a low production cost.

Figure 32:
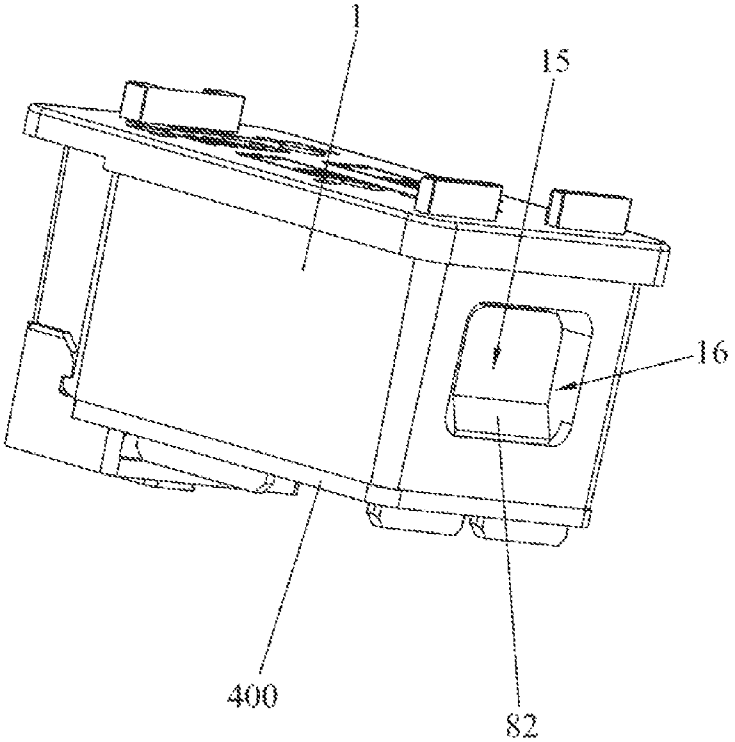
FIG. 32 is an axonometric view of another ink container and another mounting member according to an embodiment of the present application.
Figure 33:
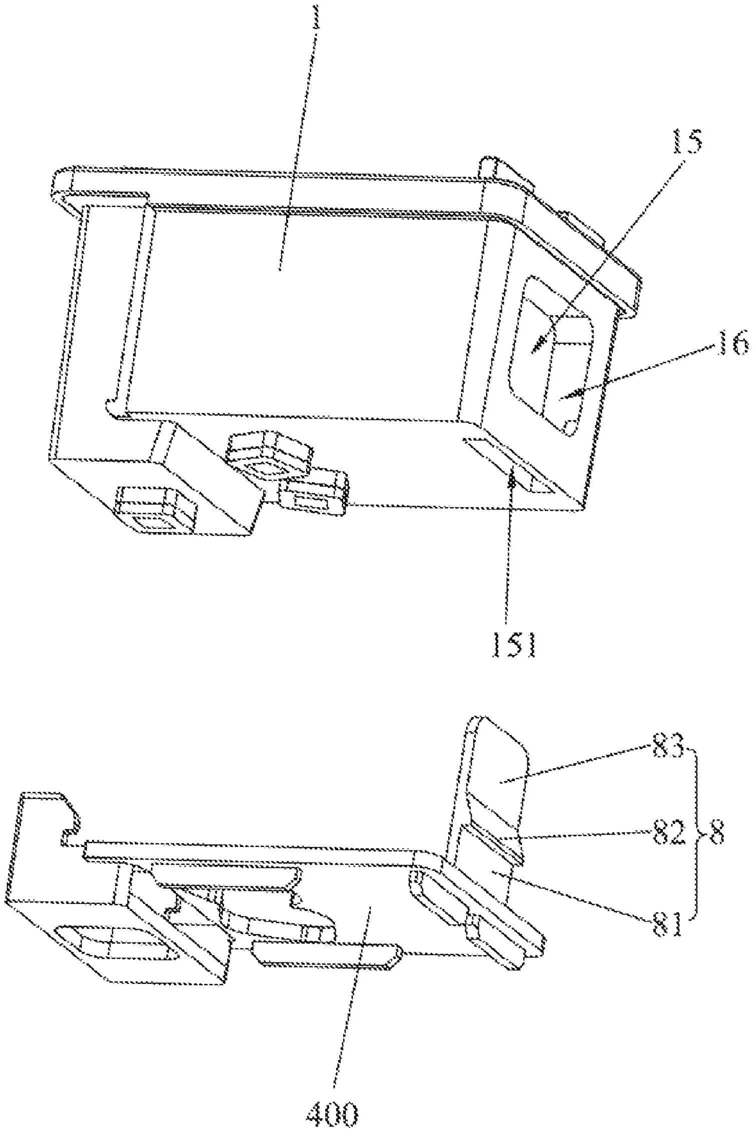
FIG. 33 is an exploded view of another ink container and another mounting member according to an embodiment of the present application.

As shown in FIGS. 32 and 33, the difference between this embodiment and the preceding embodiments lies in that the structure of the ink container body 1, the structure of the mounting member 400, and the structure of the protection member 200 are different. In this embodiment, no second engagement protrusion 112 is disposed on the ink container body 1, while an engagement hole 16 and an avoidance cavity 15 communicating with the engagement hole 16 are disposed on the ink container body 1. A cavity opening 151 of the avoidance cavity 15 penetrates through the bottom of the ink container body 1. The first elastic engagement member 8 on the mounting member 400 extends from the bottom of the ink container body 1 into the avoidance cavity 15 through the cavity opening 151 of the avoidance cavity 15 until the first hook 82 on the first elastic engagement member 8 engages with a hole wall of the engagement hole 16 in a snap-fit manner. Compared with the preceding embodiments, the first elastic engagement member 8 in this embodiment is disposed at a non-edge position of the mounting member 400. Additionally, compared with the arrangement in the preceding embodiments in which the first hook 82 and the first toggle portion 83 are disposed on two sides of the first elastic arm 81, the first toggle portion 83 has the same extension direction as the first elastic arm 81 in this embodiment.

It is to be noted that the second elastic engagement member 4 of the protection member 200 (not shown) in this embodiment is not disposed on the limit portion 33 but on the mounting portion 31 so as to be opposite to the cavity opening 151 of the avoidance cavity 15. The second elastic engagement member 4 has the same structure as the first elastic engagement member 8.

It is to be further noted that no avoidance cavity 15 may be provided in other embodiments. The first elastic engagement member 8 on the mounting member 400 slides along the outer surface of the ink container body 1 until the first book 82 extends into the engagement hole 16 and engages with the hole wall of the engagement hole 16 in a snap-fit manner. Similarly, the second elastic engagement member 4 of the protection member 200 slides along the outer surface of the ink container body 1 until the second hook 42 extends into the engagement hole 16 and engages with the hole wall of the engagement hole 16 in a snap-fit manner.

In the description of the present application, it is to be understood that the orientation or position relationships indicated by terms "above" and the like are the orientation or position relationships shown in the drawings, merely for ease of description and simplifying operations, and these relationships do not indicate or imply that the referred device or component has a specific orientation and is constructed and operated in a specific orientation, and thus it is not to be construed as a limitation to the present application.

In the description of the specification, the description of reference terms "an embodiment" and the like means that specific features, structures, materials or characteristics described in connection with the embodiment are included in at least one embodiment or example of the present application. In the specification, the schematic representation of the preceding terms does not necessarily refer to the same embodiment.

Moreover, it is to be understood that although this specification is described in terms of embodiments, not each embodiment includes only one independent technical solution. Such description mode of the specification is merely for the sake of clarity, and those skilled in the art should regard the specification as a whole. The technical solutions in multiple embodiments may also be appropriately combined to form other embodiments which will be understood by those skilled in the art.

In the present application, the ink container is mounted on the mounting member so that the ink container is connected to the cartridge. The ink container is connected to the cartridge through the mounting member. No connection structure needs to be processed on the cartridge to match the ink container, ensuring the strength of the cartridge and preventing the printhead from being damaged.

The ink cartridge according to the present application includes the cartridge and the ink container. The printhead and the mounting member are disposed on the cartridge. The ink container is mounted on the mounting member and the ink outlet of the ink outlet assembly of the ink container is made to communicate with the ink entry of the printhead on the cartridge so that the ink container is connected to the cartridge. The ink container is detachably connected to the mounting member. After the ink runs out, the ink container is separated from the mounting member and a new ink container is replaced, implementing the reuse of the cartridge. The effective utilization of the printhead on the cartridge saves cost, saves energy, and protects the environment. The mounting member is disposed on the cartridge and is connected to the ink container so that the ink container is connected to the cartridge. Therefore, no connection structure needs to be processed on the cartridge to match the ink container, simplifying the processing technique, resulting in the high structural strength of the cartridge, preventing the printhead from being damaged, and prolonging the service life of the cartridge.

What is claimed is:

1. An ink cartridge, comprising an ink container and a cartridge shell, wherein the cartridge shell has a printhead and a mounting member which are disposed on the cartridge shell, the ink container is detachably connected to the mounting member, the ink container comprises an ink container body and an ink outlet assembly, the ink container body comprises an ink storage cavity configured to store ink, an ink inlet of the ink outlet assembly communicates with the ink storage cavity, and an ink outlet of the ink outlet assembly communicates with an ink entry of the printhead.

2. The ink cartridge according to claim 1, wherein the mounting member comprises a first support portion supporting the ink container, a communication hole is disposed on the first support portion, the communication hole communicates with the ink entry of the printhead, and an end of the ink outlet assembly provided with the ink outlet extends into the communication hole.

3. The ink cartridge according to claim 2, wherein the mounting member further comprises a clamping assembly, the clamping assembly comprises two clamping portions connected to the first support portion, and the two clamping portions are disposed on two opposite sides of the ink container body respectively and configured to clamp the ink container body.

4. The ink cartridge according to claim 3, wherein a first engagement recess is disposed on each of the two clamping portions, a first engagement protrusion is correspondingly disposed on the ink container body, and the first engagement protrusion engages with a corresponding first engagement recess in a snap-fit manner.

5. The ink cartridge according to claim 4, wherein the mounting member further comprises a first elastic engagement member connected to the first support portion, a second engagement protrusion is correspondingly disposed on the ink container body, and the first elastic engagement member engages with the second engagement protrusion in a snap-fit manner.

6. The ink cartridge according to claim 5, wherein the first elastic engagement member comprises a first elastic arm and a first hook that are connected to each other, the first elastic arm is connected to the first support portion, and the first hook engages with the second engagement protrusion in a snap-fit manner.

7. The ink cartridge according to claim 6, wherein the first elastic engagement member further comprises a first toggle portion connected to the first elastic arm, and the first toggle portion is configured to drive, under an action of an external force, the first elastic arm to deform such that the first hook is detached from the second engagement protrusion-.

8. The ink cartridge according to claim 5, wherein the first support portion comprises a support body, and the support body comprises a first end and a second end that are opposite to each other, wherein the first elastic engagement member is connected to the first end of the support body, and the two clamping portions of the clamping assembly are disposed on two sides of the second end of the support body separately.

9. The ink cartridge according to claim 8, wherein the cartridge shell comprises a box body, a first side plate, and a second side plate; wherein the first side plate and the second side plate are connected to the box body; wherein the support body is connected to the box body; and wherein the first side plate and the second side plate are disposed on two sides of the second end of the support body respectively and configured to clamp the clamping assembly.

10. The ink cartridge according to claim 9, wherein the first support portion further comprises stop portions protruding from two sides of the support body, and a side of the first side plate facing the first end of the support body and a side of the second side plate facing the first end of the support body each abut against a corresponding one of the stop portions.

11. The ink cartridge according to claim 9, wherein the cartridge shell further comprises a third side plate connected to the box body, and the third side plate abuts against at least one of following members: the second end of the support body, or an end of the clamping assembly facing away from the first end of the support body.

12. The ink cartridge according to claim 8, wherein a recess is disposed on the support body, the ink container body comprises a positioning portion, and the positioning portion engages with the recess in a snap-fit manner.

13. The ink cartridge according to claim 12, wherein the support body comprises a first support body and a second support body, the ink container body further comprises a main portion, the positioning portion is connected to a bottom of the main portion, the first support body supports the main portion, and the recess is disposed on the second support body.

14. The ink cartridge according to claim 1, wherein the mounting member adheres to the cartridge shell.

15. The ink cartridge according to claim 11, wherein an ink container chip is disposed on a side of the ink container body facing the third side plate, an ink cartridge chip and a connection chip are disposed on a side of the third side plate facing away from the ink container body, the ink cartridge chip is connected to the third side plate, the connection chip comprises a first region and a second region, the first region is electrically connected to the ink cartridge chip, a mounting cavity is disposed on the third side plate and corresponds to the second region, a connection member is disposed in the mounting cavity, the connection member comprises a first pin and a second pin, the first pin is electrically connected to a contact on the second region, and the second pin is electrically connected to a contact on the ink container chip.

16. The ink cartridge according to claim 5, wherein a guide recess is disposed on the ink container body, the second engagement protrusion protrudes from a recess bottom wall of the guide recess, the guide recess comprises an assembling opening and an avoidance opening, the first elastic engagement member extends into the guide recess through the assembling opening, and the avoidance opening is configured to avoid the first elastic engagement member.

17. The ink cartridge according to claim 4, wherein the mounting member further comprises a first elastic engagement member connected to the first support portion, an engagement hole is disposed on the ink container body, and the first elastic engagement member engages with the engagement hole in a snap-fit manner.

18. The ink cartridge according to claim 17, wherein an avoidance cavity is disposed on the ink container body, the avoidance cavity communicates with the engagement hole, a cavity opening of the avoidance cavity penetrates through an outer wall of the ink container body, and the first elastic engagement member extends into the avoidance cavity through the cavity opening and engages with the engagement hole in a snap-fit manner.

19. The ink cartridge according to claim 2, wherein the mounting member adheres to the cartridge shell.

20. The ink cartridge according to claim 3, wherein the mounting member adheres to the cartridge shell.

* * * * *